(12) United States Patent
Leikert

(10) Patent No.: US 10,627,226 B2
(45) Date of Patent: Apr. 21, 2020

(54) CALIBRATION SYSTEM FOR SENSORS AND CAMERAS ON VEHICLES

(71) Applicant: Robert Bosch GmbH, Stuttgart (DE)

(72) Inventor: Reiner Leikert, Munich (DE)

(73) Assignees: Bosch Automotive Service Solutions Inc., Warren, MI (US); Robert Bosch GmbH, Suttgart (DE)

(*) Notice: Subject to any disclaimer, the term of this patent is extended or adjusted under 35 U.S.C. 154(b) by 0 days.

(21) Appl. No.: 16/394,694

(22) Filed: Apr. 25, 2019

(65) Prior Publication Data

US 2019/0249986 A1  Aug. 15, 2019

Related U.S. Application Data

(63) Continuation of application No. 15/396,099, filed on Dec. 30, 2016, now Pat. No. 10,323,936.

(51) Int. Cl.
*G01B 11/275* (2006.01)

(52) U.S. Cl.
CPC ...... *G01B 11/2755* (2013.01); *G01B 2210/12* (2013.01)

(58) Field of Classification Search
CPC G01B 11/2755; G01B 2210/12; G01B 5/065; G01B 11/2504; G01B 21/042; G01B 11/275; G01C 25/00; G01N 29/30

USPC ....... 73/1.75, 1.79, 1.81, 1.82, 1.86; 33/281, 33/282, 285, 286, 600, 335–337, 33/203–203.21

See application file for complete search history.

(56) References Cited

U.S. PATENT DOCUMENTS

| 4,630,379 | A | 12/1986 | Wickmann et al. |
| 7,121,011 | B2 | 10/2006 | Murray et al. |
| 7,424,387 | B1 | 9/2008 | Gill et al. |
| 2017/0003141 | A1* | 1/2017 | Voeller ............... G01B 11/272 |
| 2018/0052223 | A1* | 2/2018 | Stieff ................... G01B 11/27 |

\* cited by examiner

*Primary Examiner* — Robert R Raevis
(74) *Attorney, Agent, or Firm* — Maginot, Moore & Beck LLP

(57) ABSTRACT

A sensor calibration tool, in particular for calibrating sensors on a vehicle, includes a vertical rail defining a first axis, and first and second carriage assemblies. The first carriage assembly is supported by the vertical rail, movable along the first axis, and has a horizontal rail defining a second axis transverse to the first axis. The second carriage assembly is supported by the horizontal rail, movable along the second, and has a target mount that releasably supports a calibration target. A calibration tool includes a horizontal rail defining a first axis, a first carriage assembly movable along the first axis, a mounting bar defining a second axis and pivotable about a pivot axis transverse to the first and second axes, and a target mount positioned on the mounting bar. The first carriage assembly and the mounting bar move independently.

6 Claims, 15 Drawing Sheets

CALIBRATION SYSTEM FOR SENSORS AND CAMERAS ON VEHICLES

RELATED APPLICATIONS

This disclosure is a Continuation of, and claims the benefit of priority to, U.S. patent application Ser. No. 15/396,099 filed on Dec. 30, 2016 which issued as U.S. Pat. No. 10,323,936on Jun. 18, 2019, the disclosure of which is incorporated herein in its entirety.

TECHNICAL FIELD

This disclosure relates generally to sensor calibration systems, and more particularly to systems for calibrating sensors on vehicles.

BACKGROUND

Cameras and other types of sensors have been used on vehicles to enable systems that act as driving aids, such as for safety, awareness, or comfort. For example, an adaptive cruise control system generally uses sensors to detect the proximity of another vehicle in order to adjust vehicle speed or maintain a set vehicle spacing. In another example, a lane departure warning system generally uses sensors to detect a location of a vehicle within a lane of traffic in order to provide a warning to the driver or execute an automatic correction in the event that the vehicle is straying from the lane of traffic. Automated or assisted driving systems generally use sensors to enable machine vision that is used to navigate the vehicle to a destination while avoiding obstacles and obeying traffic laws and procedures. The sensors for these types of systems are generally mounted on the vehicle at various locations and orientations so as to collect the data needed to operate the systems.

In order to operate effectively, however, data read by the sensors must be relatable to a known orientation and location on the vehicle. For example, if the sensor is not located on a portion of the body of the vehicle that is closest to an obstacle, than the distance between the sensor and the obstacle sensed by the sensor will not indicate the true proximity of the obstacle. A known location and orientation of a sensor on the body of the vehicle can be used with a sensor reading in order to determine a true distance between an obstacle and the body of the vehicle.

Thus, the accuracy and effectiveness of systems relying on sensors depends on the accuracy of the location and orientation information for the sensors on the body of the vehicle. Generally, sensors on a vehicle are mounted at known locations relative to defined points such as an axle or wheel, and are oriented relative to a "thrust line" of the vehicle. The thrust line of a vehicle extends forwardly from a point of intersection of the rear transverse axis of the rear wheels and the longitudinal center line of the vehicle at an angle to the center line. The angle that the thrust line makes with respect to the center line of the vehicle is determined by the toe of the rear wheels, and is generally relatively small; for example, as close to zero as possible.

A calibration process is customarily used in order to determine or validate the location and orientation of a sensor. Devices used for calibration generally include an alignment element such as a mirror or optical target mounted on a stand that is placed at a fixed location in front of the vehicle so that the target is within a line-of-sight of the sensor. Precise calibration requires that the alignment element is positioned and oriented accurately in front of the vehicle according to that vehicle's specific manufacturer's specifications. Each vehicle may include a multitude of different types of sensors at different locations. Further, depending on the manufacturer's specifications, the alignment element may have to be oriented accurately relative to the vehicle in up to six different degrees of freedom; e.g., distance in front of the vehicle, left-to-right centering, perpendicularity to the thrust line, height, orientation about a horizontal axis, and orientation about an axis along the thrust line.

As a result, the number and position of alignment elements needed to calibrate the sensors of different vehicles can vary drastically from manufacturer to manufacturer, and even from vehicle to vehicle. Thus, each manufacturer generally provides one or more separate calibration devices that include the alignment elements adapted to the vehicles they offer for sale. Conventionally, mechanics and service professionals that seek to cater to a wide variety of makes and models of vehicles need to obtain and use a multitude of different calibration devices, which are customarily costly, and which require significant training to operate and maintain. Therefore, reducing the number of calibration devices needed to cater to a wide variety of vehicles would be beneficial.

SUMMARY

In one or more embodiments, a sensor calibration kit or system according to this disclosure includes a calibration tool, a front wheel alignment post, a rear wheel alignment post, a central extension mount, a laser line unit, and a plurality of calibration targets.

In one or more embodiments, the calibration tool includes a vertical rail that defines a first rail axis, a vertically movable carriage assembly supported by the vertical rail and movable along the first rail axis and having a horizontal rail that defines a second rail axis transverse to the first rail axis, and a horizontally movable carriage assembly supported by the horizontal rail and movable along the second rail axis. The horizontally movable carriage assembly has a transverse mounting bar with a plurality of target mounts. Each target mount is configured to releasably support a respective calibration target.

In one or more embodiments, the transverse mounting bar includes a mounting rail that defines a third rail axis transverse to the first rail axis. The plurality of target mounts are supported by the mounting rail and movable along the third rail axis.

In one or more embodiments, the transverse mounting bar is pivotably mounted on the second carriage assembly so as to be pivotable about a pivot axis transverse to the third rail axis.

In one or more embodiments, the horizontally movable carriage assembly further includes a spring member positioned between the horizontally movable carriage assembly and the transverse mounting bar on a first side of the pivot axis and configured to exert a force acting on the transverse mounting bar in a first direction about the pivot axis, and an adjustment member positioned between the horizontally movable carriage assembly and the transverse mounting bar on a second side of the pivot axis opposite the first side and operable to counter-act the force of the spring member to set a pivot position of the transverse mounting bar about the pivot axis.

In one or more embodiments, the transverse mounting bar includes a first ruler oriented parallel to the third rail axis.

In one or more embodiments, the calibration tool further includes a second ruler oriented parallel to the first rail axis.

In one or more embodiments, the calibration tool further includes a base plate assembly supporting the vertical rail and including an alignment member configured to align the calibration tool with a predetermined reference point.

In one or more embodiments, the kit further includes a line laser unit that is configured to produce a line laser configured to align the calibration tool relative to at least one of a measurement axis, a measurement orientation, and a vehicle.

In one or more embodiments, the line laser unit is mountable on the second carriage at a first position whereat the line laser unit is configured to produce a laser line extending parallel to the third rail axis to identify a yaw angle for the plurality of target mounts relative to the first rail axis, and a second position whereat the line laser unit is configured to produce a laser line extending perpendicular to the third rail axis to identify a centerline of the calibration tool.

In one or more embodiments, in the first position, the line laser unit is on a top surface of the horizontally movable carriage assembly. In the second position, the line laser unit is on a front-facing side surface of the horizontally movable carriage assembly such that the horizontally movable carriage assembly is between the line laser unit and the vertical rail.

In one or more embodiments, the front wheel alignment includes a first adjustment target configured to locate the front wheel alignment post relative to a wheel well of a front wheel of the vehicle, and a first mount configured to removably mount the line laser unit in a third position whereat the line laser unit is configured to produce a line laser on the front wheel of the vehicle such that the front wheel alignment post can be aligned with a center of the front wheel.

In one or more embodiments, the rear wheel alignment post includes a second adjustment target configured to locate the rear wheel alignment post relative to a wheel well of a rear wheel of the vehicle, and a second mount configured to removably mount the line laser unit in a fourth position whereat the line laser unit is configured to produce a line laser on the first adjustment target, such that the rear wheel alignment post can be aligned with the front wheel alignment post.

In one or more embodiments, the front wheel alignment post includes a mounting point configured to receive a measuring tape.

In one or more embodiments the first adjustment target of the front wheel alignment post includes a first level, and the front wheel alignment post further includes a plurality of individually adjustable feet.

In one or more embodiments, the second adjustment mount of the rear wheel alignment post includes a second level, and the rear wheel alignment post further includes a plurality of individually adjustable feet.

In one or more embodiments, in the first position, the line laser unit is on a top surface of the horizontally movable carriage assembly. In the second position, the line laser unit is on a front-facing side surface of the horizontally movable carriage assembly such that the horizontally movable carriage assembly is between the line laser unit and the vertical rail.

In one or more embodiments, the kit further includes at least one safety cord that is assigned to at least one calibration target, and at least one of the plurality of target mounts is a magnetic mounting point configured to magnetically engage with the at least one calibration target. The safety cord is configured to engage with the at least one calibration target.

In one or more embodiments, the central extension mount is supported by the vertically movable carriage assembly so as to extend parallel to the first rail axis. The central extension mount is configured to removably receive a first portion of a first calibration target, and a central mount is positioned on the horizontally movable carriage assembly and configured to removably receive a second portion of the first calibration target so that the first calibration target is parallel to the first rail axis.

In one or more embodiments, different combinations and positions of the plurality of different calibration targets enables calibration of sensors on different vehicles based on predetermined specifications corresponding to the different vehicles.

DETAILED DESCRIPTION

Figure 1:
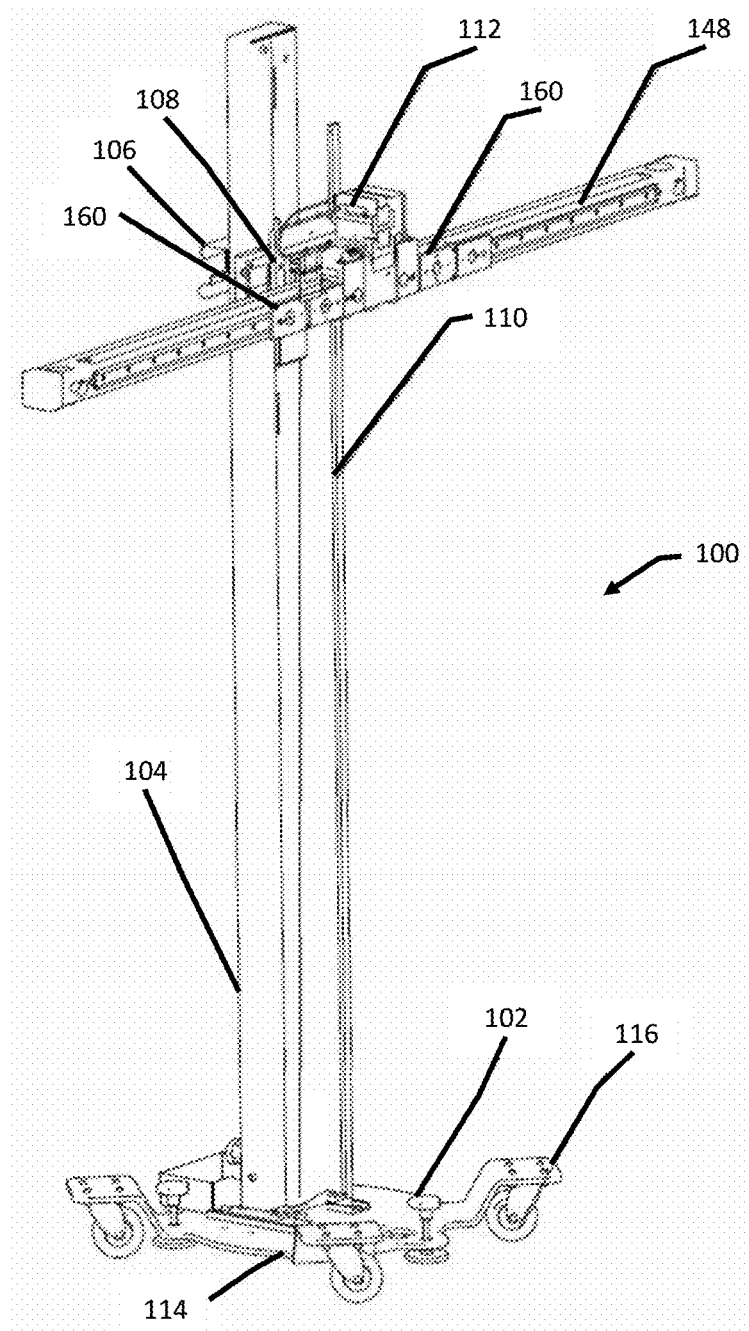
FIG. 1 depicts a perspective view of an exemplary embodiment of a calibration tool for a sensor calibration kit according to this disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

A sensor calibration system or kit according to this disclosure includes one or more parts usable for calibrating sensors and cameras on various makes and models of vehicles.

FIG. 1 depicts a perspective view of an exemplary embodiment of a sensor calibration tool 100 included in a sensor calibration system according to this disclosure. The calibration tool 100 includes a base plate assembly 102, a vertical rail 104, a vertically movable carriage assembly 106, a transverse carriage assembly 108, a first ruler 110, and a line laser unit 112.

The first ruler 110 extends parallel to the vertical rail 104, and includes measurement markings.

Figure 2A:
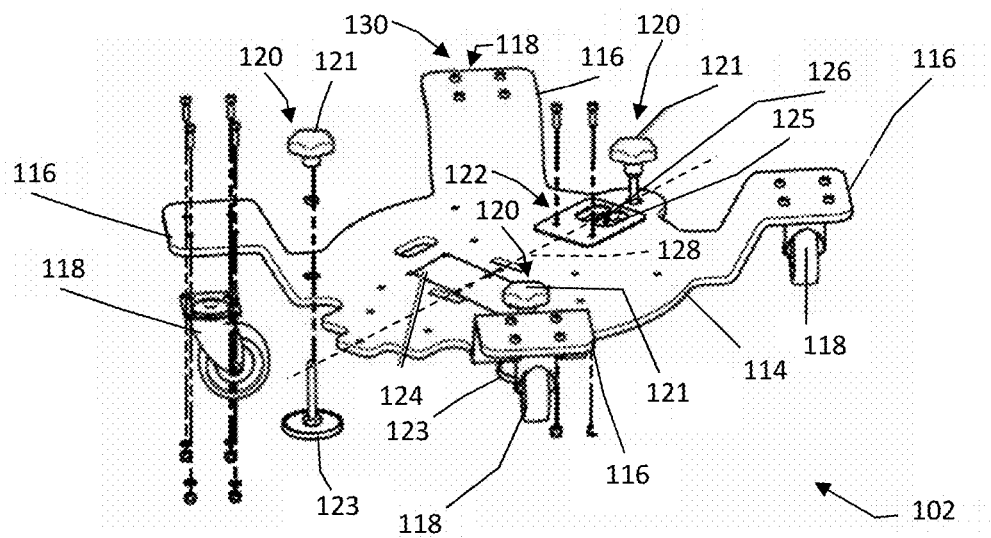
FIGS. 2A and 2B depicts perspective view different exemplary embodiments of a base plate assembly for the calibration tool from FIG. 1.

FIG. 2A depicts an exploded perspective view of the base plate assembly 102. The base plate assembly 102 includes a base portion 114, a plurality of elevated wheel mounts 116, a plurality of wheels 118, and a plurality of feet 120.

The base portion 114 of the base plate assembly 102 includes a mounting region 124 and an alignment member 125. The alignment member 125 is configured to position the base plate assembly 102 at a predetermined location on a surface on which the calibration tool 100 is located. In this embodiment, the alignment member 125 includes at least one aperture 122 and at least one locating member 126, in this instance a rib 126 that runs along a central axis 128 of the base plate assembly 102.

In this embodiment, the base plate assembly 102 includes four elevated wheel mounts 116, although more and less wheel mounts are included in other embodiments. The plurality of elevated wheel mounts 116 are distributed around the base portion 114. A respective wheel 118 is mounted to each of the elevated wheel mounts 116. The wheels 118 are configured to enable a user to move the calibration tool 100.

The plurality of feet 120 are mounted on the base portion 114 of the base plate assembly 102, and each include a screw member 121 and a foot member 123. The feet 120 are configured such that a first operation of a respective screw member 121 causes a corresponding foot member 123 to extend downwards toward a surface on which the calibration tool 100 is positioned and lift base portion 114 and the plurality of wheels 118 from off the surface. The feet 120 are further configured such that a second operation of the respective screw member 121 causes the corresponding foot member 123 to retract the foot member 123 and move the base portion 114 and the plurality of wheels 118 toward the surface.

Figure 2B:
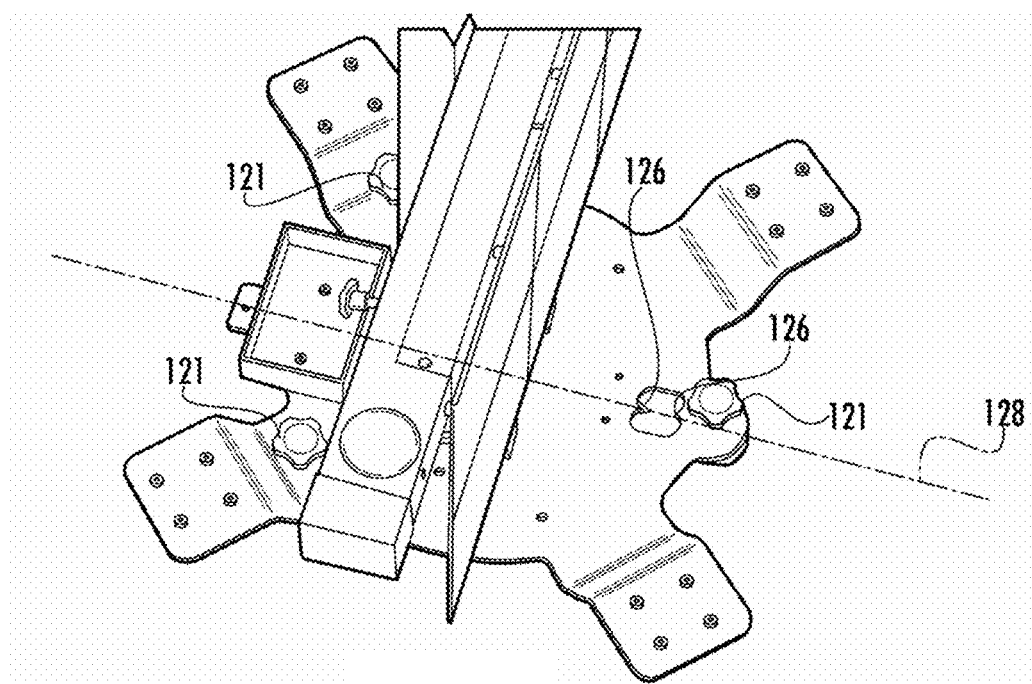

FIG. 2B depicts a perspective view of another embodiment of the base plate assembly 102 where the wheels 118 are omitted. In this embodiment, the screw members 121 are adjustment knobs 121, and the locating member 126 is a pair of nubs 126 aligned with the central axis 128.

Figure 3:
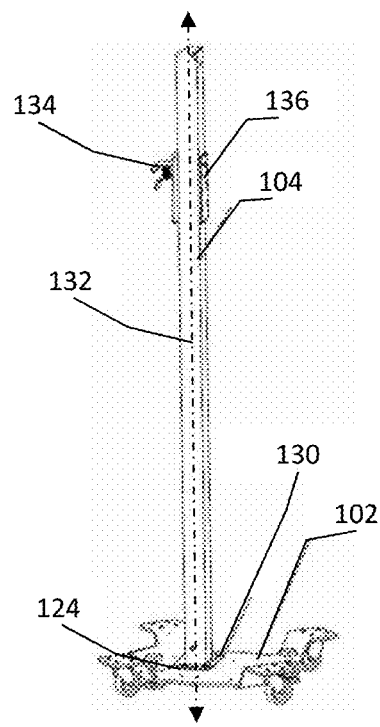
FIGS. 3 and 4 depict perspective views of different portions of the calibration tool of FIG. 1.

As illustrated in FIG. 3, a lower end 130 of the vertical rail 104 is received in the mounting region 124 of the base plate assembly 102. The vertical rail 104 defines a first rail axis 132. A carriage base 136 of the vertically movable carriage assembly 106 (FIG. 1) is supported by the vertical rail 104 so as to be movable along the first rail axis 132. In FIG. 3, elements of the vertically movable carriage assembly 106 (FIG. 1) other than the carriage base 136 are omitted.

In this embodiment, the carriage base 136 includes a locking handle 134 that is selectively actuatable. In an un-actuated position, the locking handle 134 is configured to hold the carriage base 136 at a fixed position along the vertical rail 104. In an actuated position, the locking handle 134 is configured to release the carriage base 136 to move along the vertical rail 104. In other embodiments, other types of locking mechanisms for holding the carriage base 136 in place are also contemplated such as, for example, a pin, screw, clip, rack-and-pinion, etc.

Figures 4, 5:
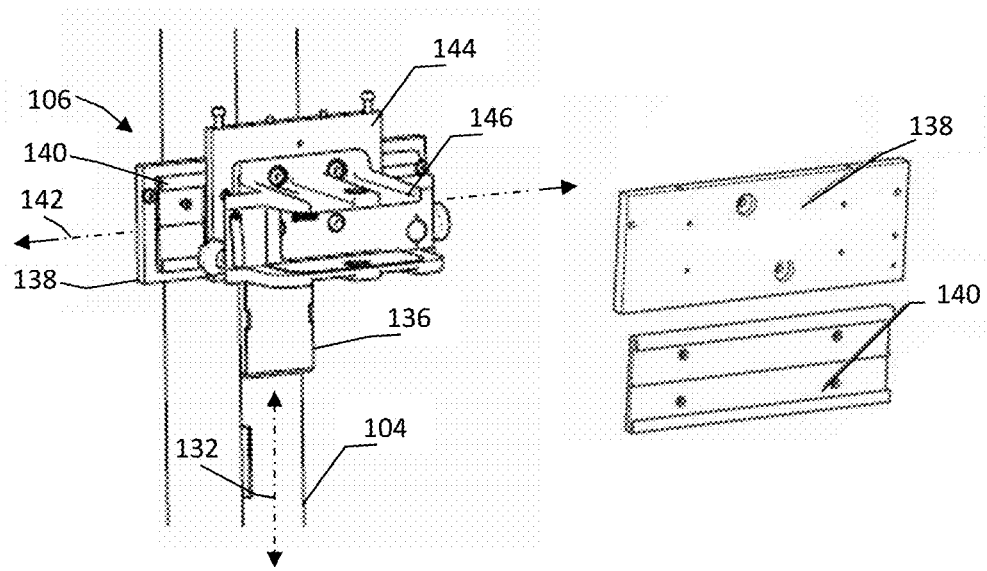
FIG. 5 depicts an exploded perspective view of a vertically movable carriage from the calibration tool of FIG. 1.

FIG. 4 depicts a perspective view of the vertically movable carriage assembly 106 and a backing plate 144 and a clamp member 146 of the transverse carriage assembly 108 mounted together with the vertical rail 104. Elements of the transverse carriage assembly 108 other than the backing plate 144 and the clamp member 146 are omitted.

The vertically movable carriage assembly 106 includes the carriage base 136, a back plate 138, and a horizontal rail 140. FIG. 5 depicts an exploded view of the back plate 138 and horizontal rail 140. As illustrated in FIG. 4, the back plate 138 is mounted on the carriage base 136, and the horizontal rail 140 is mounted on the back plate 138 so that the back plate 138 is disposed between the horizontal rail 140 and the carriage base 136.

The horizontal rail 140 defines a second rail axis 142 that is transverse to the first rail axis 132. As used herein, the term "transverse" means not parallel, but does not require, for example, that different axes intersect. For instance, in FIG. 4 the second rail axis 142 is laterally offset from the first rail axis by the thickness of the vertically movable carriage assembly 106, and the axes 142 and 132 thus do not intersect while being non-parallel and thus transverse to each other. In some embodiments, however, axes that are transverse also intersect. The backing plate 144 of the transverse carriage assembly 108 is supported by the horizontal rail 140 so that the transverse carriage assembly 108 is movable along the second rail axis 142.

Figure 6A:
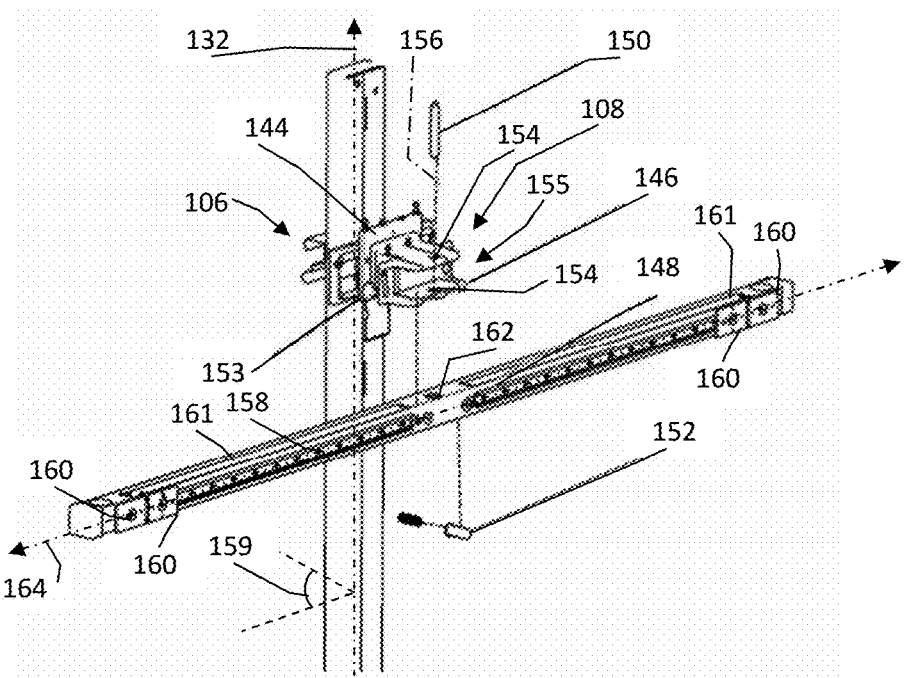
FIGS. 6A, 6B, and 7 depict different perspective views of a horizontally movable carriage assembly for the calibration tool of FIG. 1.

As illustrated in the exploded view of FIG. 6A, the transverse carriage assembly 108 includes the backing plate 144, the clamp member 146, a transverse mounting bar 148, a pivot member 150, a spring member 152, and an adjustment member 153.

The clamp member 146 is mounted on the backing plate 144 so that the backing plate 144 is disposed between the clamp member 146 and the horizontal rail 140. The clamp member 146 defines a channel 155 running transverse to the first rail axis 132 and a pair of holes 154 aligned parallel to the first rail axis 132 to define a pivoting axis 156.

The transverse mounting bar 148 includes a transverse rail 158, a plurality of target mounts 160, and a second ruler 161, and also defines a pivoting hole 162. The transverse rail 158 extends over substantially an entire length of the transverse mounting bar 148. In this embodiment, the transverse rail 158 is depicted as separated into two parts on either side of the pivoting hole 162, but in some embodiments, the transverse rail 158 is continuous, or is divided into additional segments.

The transverse mounting bar 148 is mounted in the channel 155 so that the pivoting hole 162 is aligned with the pair of holes 154 in the clamping member 146. The pivot member 150, in this embodiment a pin 150, extends through the pair of holes 154 in the clamping member 146 and through the pivoting hole 162 in the transverse mounting bar 148 in order to mount the transverse mounting bar 148 in the clamping member 146 so as to be pivotable about the pivoting axis 156.

The transverse rail 158 of the transverse mounting bar 148 defines a third rail axis 164 that is transverse to the first rail axis 132. Pivoting the transverse mounting bar 148 about the pivot axis 156 adjusts a yaw angle 159 of the transverse mounting bar 148 relative to the first rail axis 132.

Figure 6B:
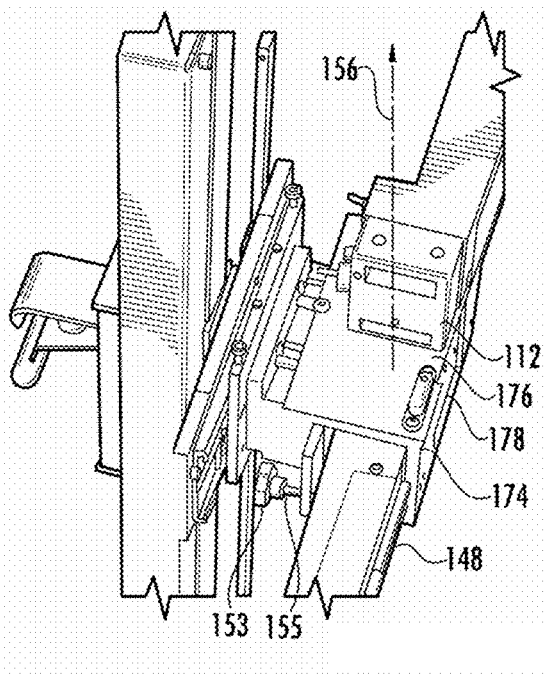

The spring member 152 is disposed between the transverse mounting bar 148 and the clamping member 146 on a first side of the pivoting hole 162, and the adjustment member 153, in this embodiment an adjustment knob 152, is disposed in the clamping member 146 on an opposite side of the pivoting hole 162. FIG. 6B depicts a detail view of the adjustment member 153. Operating the adjustment member 153 adjusts a position of a screw 155 that counter-acts a force of the spring member 152 (FIG. 6A) and sets a pivot position of the transverse mounting bar 148 about the pivoting axis 156.

FIG. 6B also illustrates a mounting bracket 174 that can be included with the sensor calibration kit. The mounting bracket 174 is mounted on the second carriage assembly 108, and includes a top face 176 disposed on top of the clamping member 146, and a front facing side 178 that closes off the channel 155 of the clamping member 146.

Figure 7:
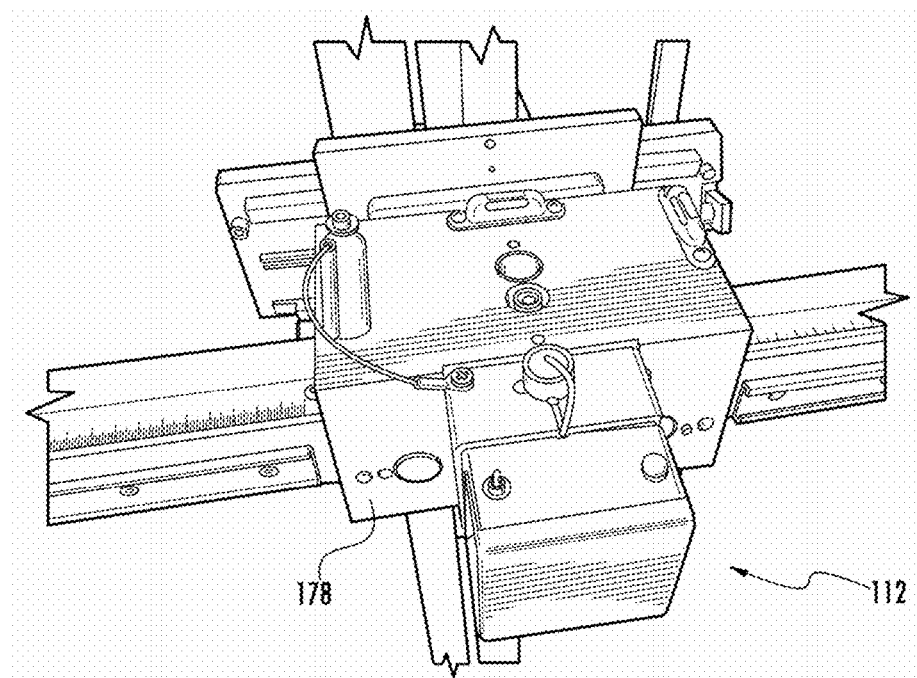

The front facing side 178 is configured as a front laser unit mounting point 178, and the top face 176 is configured as a top laser unit mounting point 176. In FIG. 6B, the line laser unit 112 is mounted on the top face 176 is configured as a top laser unit mounting point 176, but the line laser unit 112 can be repositioned to other line laser mounting points, as discussed in further detail below. FIG. 7 illustrates an example where the line laser unit 112 is mounted on the front laser unit mounting point 178.

Figure 8:
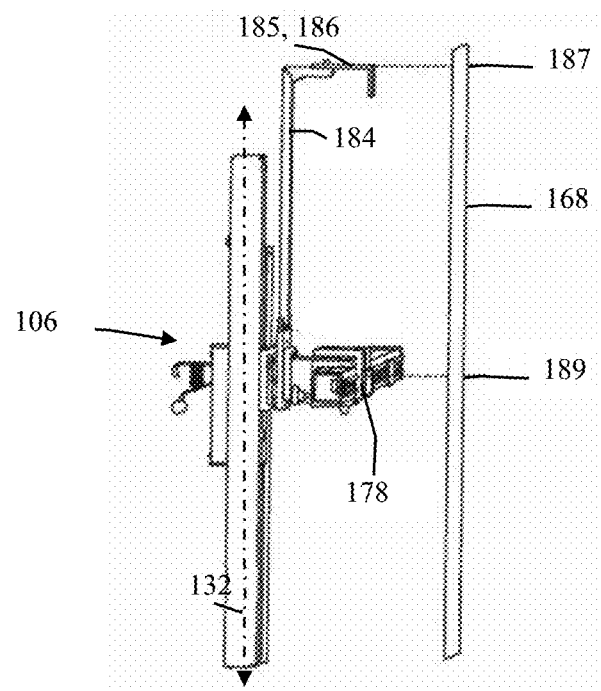
FIGS. 8 and 9 depict a perspective view of different exemplary embodiments of a central extension mount for a sensor calibration kit according to this disclosure.
Figure 9:
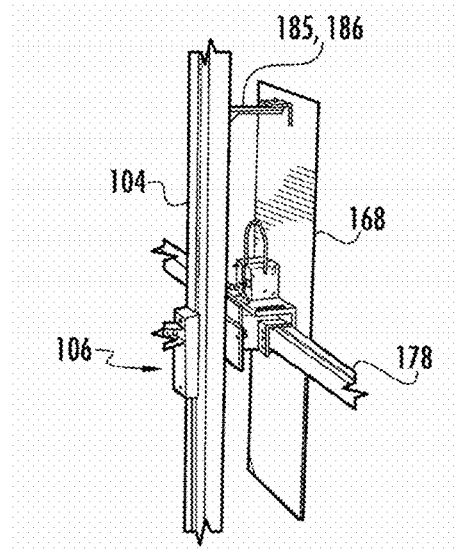
Figure 10:
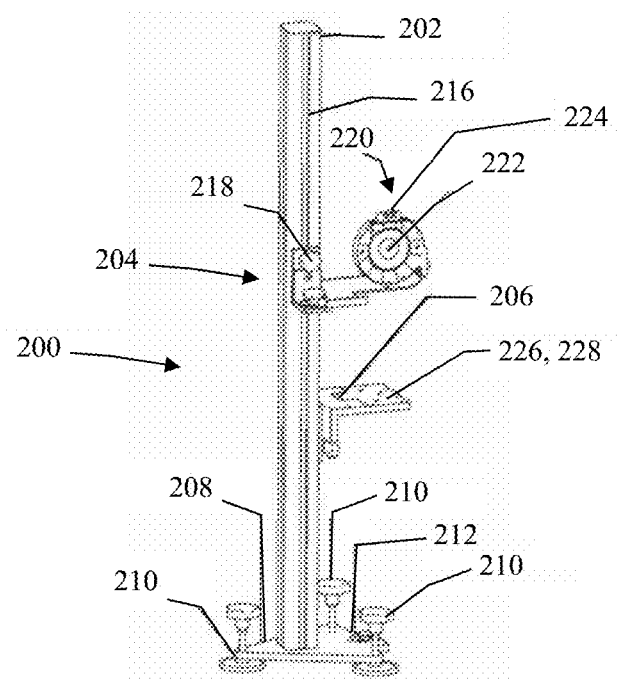
FIG. 10 depicts a perspective vie of an exemplary embodiment of a front wheel alignment post for a sensor calibration kit according to this disclosure.

FIGS. 8 and 9 depict different exemplary embodiments of a central mount extension 184 that can also be included in the sensor calibration kit. In FIG. 8, the central mount extension 184 is mounted on the vertically movable carriage assembly 106 so as to extend parallel to the first rail axis 132, and includes a top bracket 185 that is coplanar with the front facing side 178 of the mounting bracket 174. The top bracket 185 is configured as a top central mount 186. In this embodiment, the front facing side 178 is further configured as a target mount to receive a first portion 187 of a central calibration target 168 The top central mount 186 is configured to receive a second portion 189 of a calibration target 168 such that the calibration target 168 in FIG. 10 is at an orientation running parallel to the first rail axis 132. The embodiment in FIG. 9 depicts is similar to the example illustrated in FIG. 10. In this embodiment, however, the central mount extension 184 is mounted on the vertical rail 104 instead of on the vertically movable carriage assembly 106.

As discussed above, in order to calibrate sensors on a vehicle, a calibration tool is positioned and oriented at a predefined location relative to the vehicle. In other words, each manufacturer or each vehicle may include specifications that define a predetermined location and orientation for calibration targets needed to calibrate the sensors on a particular vehicle. In some embodiment, additional elements are included in the sensor calibration kit to facilitate locating and positioning the calibration tool 100 relative to a vehicle.

FIG. 10 depicts a front wheel alignment post 200 that facilitates locating the calibration device 100 (FIG. 1) relative to a vehicle. The front wheel alignment post 200 includes a front alignment bar 202, a first adjustment target 204, a laser unit mounting bracket 206, and a front post base plate 208.

The front post base plate 208 includes a plurality of adjustable feet 210 and a ruler tape mount 212. The adjustable feet 210 are operable to level the first post base plate 208. The ruler tape mounting point 212 is configured to receive an end of a ruler tape, as discussed in more detail below.

The front alignment bar 202 is mounted on the front post base plate 208 so as to extend in a direction normal to the front post base plate 208. The front wheel alignment post 200 defines a front post rail 216 that extends along the direction normal to the front post base plate 208.

The first adjustment target 204 is supported by the front post rail 216 so as to be movable along the direction normal to the front post base plate 208, and includes a locking knob 218 and a target region 220. The locking knob 218 is operable to selectively fix the first adjustment target 204 in place along the front post rail 216 and enable the first adjustment target 204 to move along the front post rail 216. The target region 220 includes a laser target 222 and a level 224. The level 224, in this embodiment a spirit level 224, is usable with the plurality of adjustable feet 210 for leveling the first adjustment target member 204 of the front wheel alignment post 200. The laser target 222 facilitates orienting a further measurement post, as discussed in further detail below.

The laser unit mounting bracket 206 is affixed to the front alignment bar 202, and includes a first face 226 parallel to the first post base plate 208. The first face 226 is configured as a first post laser unit mount 228 to receive the line laser unit 112 for locating the front wheel alignment post 200 relative to a front wheel of a vehicle, as discussed in further detail below.

Figure 11:
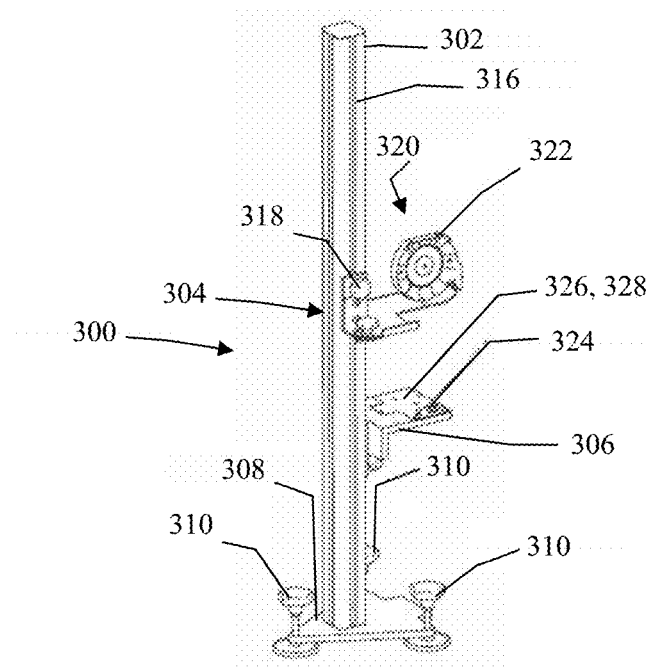
FIG. 11 depicts a perspective vie of an exemplary embodiment of a rear wheel alignment post for a sensor calibration kit according to this disclosure.

FIG. 11 depicts a rear wheel alignment post 300 that facilitates locating the calibration device 100 relative to a vehicle. The rear wheel alignment post 300 includes a rear alignment bar 302, a second adjustment target 304, a laser unit mounting bracket 306, and a rear post base plate 308.

The rear post base plate 308 includes a plurality of adjustable feet 310. The adjustable feet 310 are operable to level the second post base plate 308. The rear alignment bar 302 is mounted on the rear post base plate 308 so as to extend in a direction normal to the second post base plate 308. The rear alignment bar 302 defines a rear post rail 316 that extends along the direction normal to the rear post base plate 308.

The second adjustment target 304 is supported by the rear post rail 316 so as to be movable along the direction normal to the rear post base plate 308, and includes a locking knob 318 and a target region 320. The locking knob 318 is operable to selectively fix the second adjustment target 304 in place along the rear post rail 316 and enable the second adjustment target 304 to move along the rear post rail 316. The target region 320 includes a laser target 322.

The laser unit mounting bracket 306 is affixed to the rear alignment bar 302, and includes a first face 326 parallel to the second post base plate 308. The first face 326 is configured as a rear post laser unit mount and includes a level 324. The second post laser unit mount 328 is configured to receive the line laser unit 112 for locating the second measuring post 200 relative to the front wheel alignment post 200, as discussed in further detail below. The level 324, in this embodiment a spirit level 324, is usable with the plurality of adjustable feet 310 for leveling the first face 326 of the rear wheel alignment post 300.

FIGS. 12-21 illustrate various stages of an exemplary process of locating the calibration tool 100 relative to a vehicle 400 using the front wheel alignment post 200 and rear wheel alignment post 300.

Figure 12:
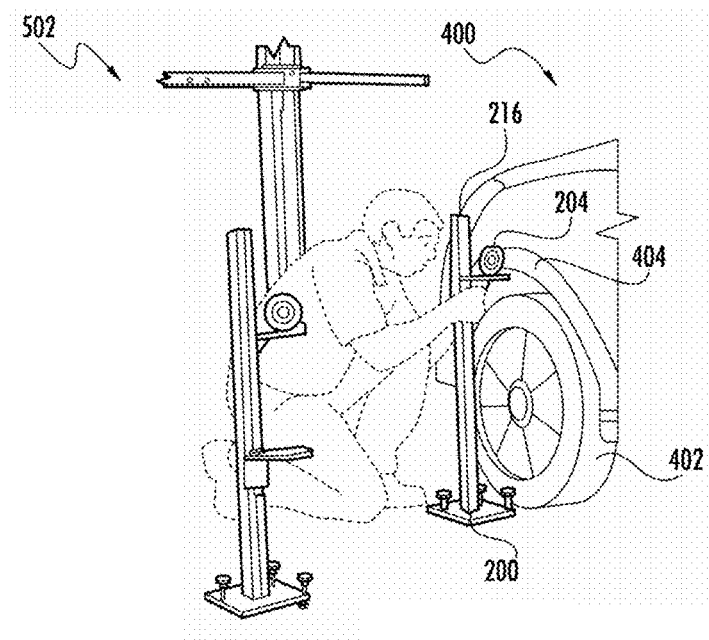
FIGS. 12-26 depict different steps of an exemplary process for aligning the calibration tool of FIG. 1 with a vehicle using the front wheel alignment post from FIG. 10 and the rear wheel alignment post from FIG. 11.

FIG. 12 depicts an image 502 in which the first adjustment target 204 is positioned along the front post rail 216 and the front wheel alignment post 200 is positioned at a front wheel 402 of the vehicle 400 such that the first adjustment target 204 abuts and is oriented perpendicularly to a wheel well 404 of the front wheel 402.

Figure 13:
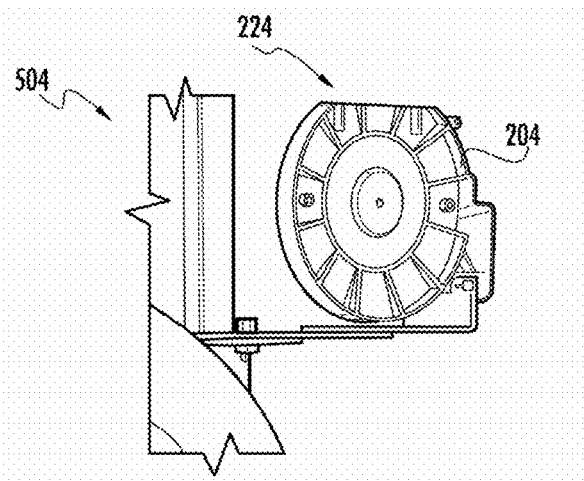

FIG. 13 depicts an image 504 in which the first adjustment target 204 is leveled according to the level 224 by operating the plurality of adjustable feet 210 on the first measurement post 200.

Figure 14:
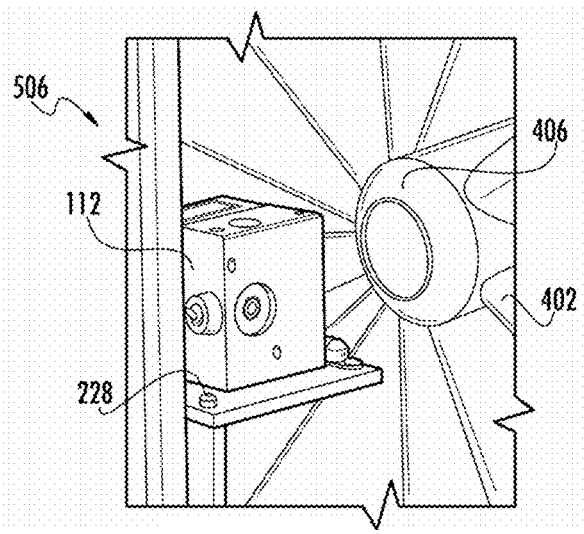

FIG. 14 depicts an image 506, in which the laser line unit 112 is mounted on the first post laser unit mount 228 and operated to produce a laser line 406. The front wheel alignment post 200 is then centered relative to the front wheel 402 such that the laser line 406 is centered with the front wheel 402.

Figure 15:
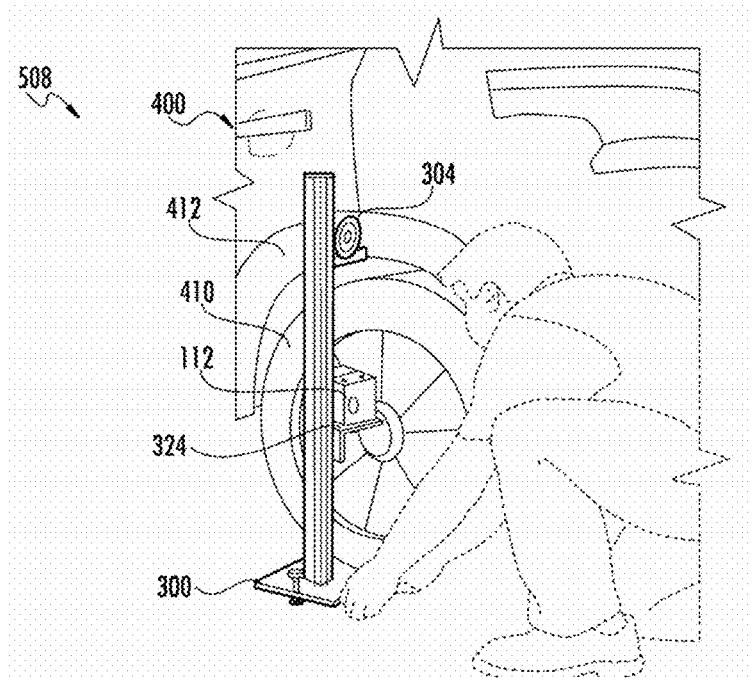

FIG. 15 depicts an image 508, in which the rear wheel alignment post 300 is positioned at a rear wheel 410 of the vehicle 400 such that the second adjustment target 304 abuts and is oriented perpendicularly to a wheel well 412 of the rear wheel 410. The laser line unit 112 is mounted on the second post laser unit mounting point 328, and is leveled according to the level 324 by operating the plurality of adjustable feet 310 on the second measurement post 300.

Figure 16:
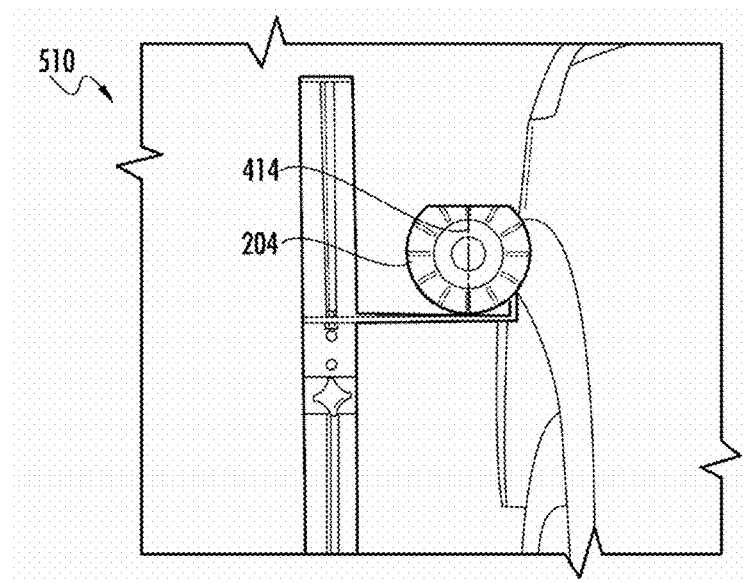

FIG. 16 depicts an image 510, in which the laser line unit 112 is operated to produce a laser line 414. The rear wheel alignment post 300 is then rotated so that the laser line 414 is centered on the first adjustment target member 204.

Figure 17:
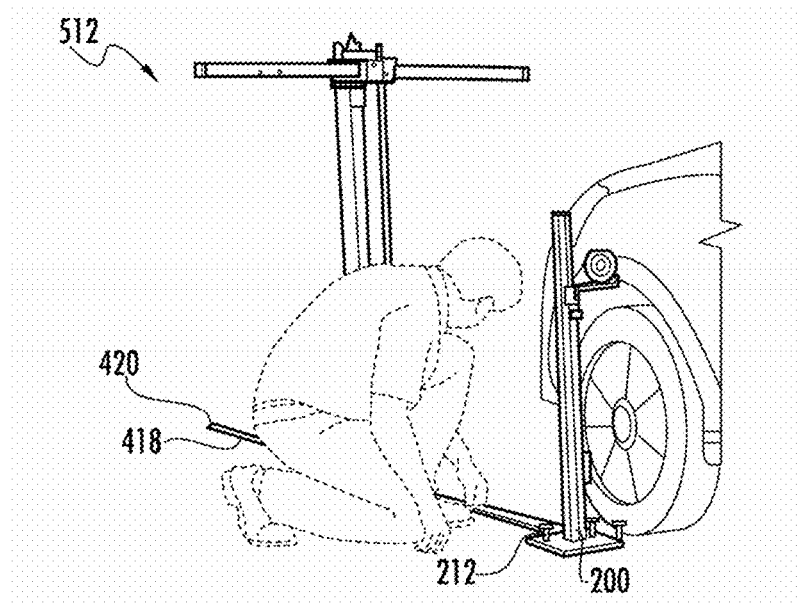

FIG. 17 depicts an image 512, in which a measuring tape 418 is mounted on the ruler tape mounting point 212 of the front wheel alignment post 200 in order to identify a first reference mark 420 using a distance predetermined according to the specifications corresponding to the vehicle 400. In another embodiment, a surface on which the vehicle 400 is positioned includes markings for measuring distances, and is used instead of or in addition to the measuring tape 418. Other measurement techniques are also contemplated.

Figure 18:
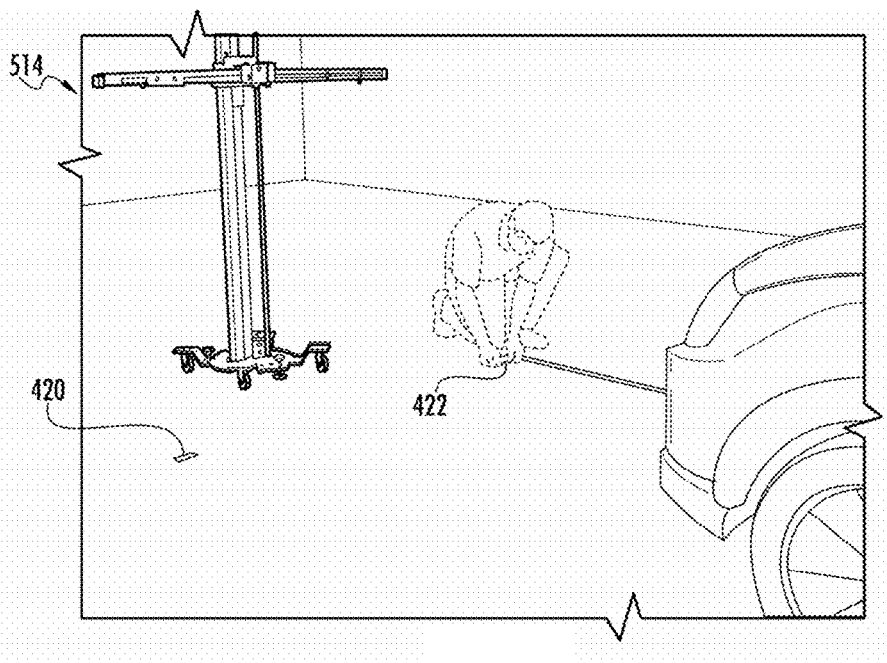

FIG. 18 depicts an image 514, whereby the process from images 502, 504, 506, 508, 510, and 512 are repeated for the opposite side of the vehicle 400 in order to identify a second reference mark 422.

Figure 19:
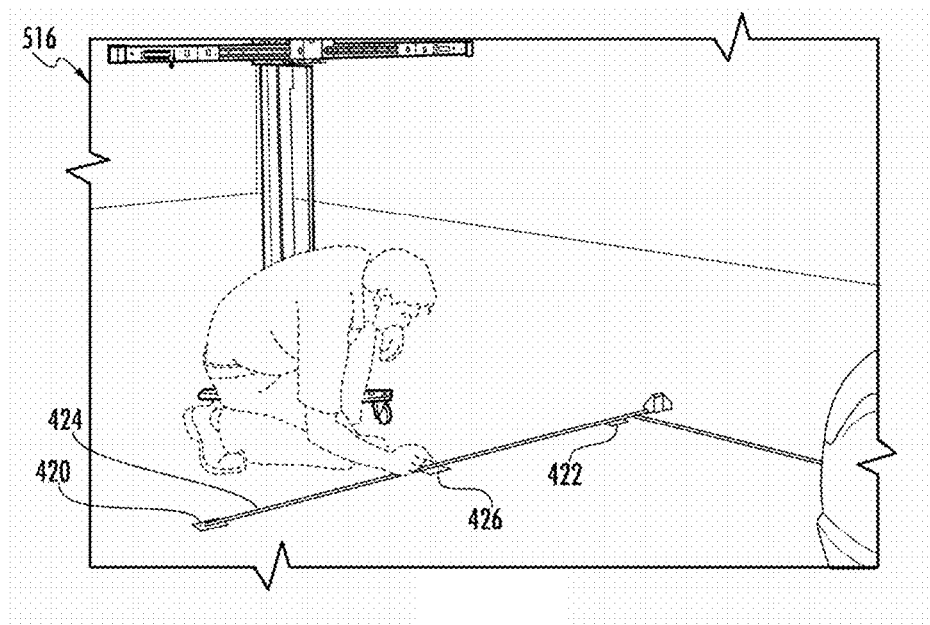

FIG. 19 depicts an image 516, in which a straight-edge tool 424, such as a measuring tape or ruler, is used to identify a center reference mark 426 centered between the first reference mark 420 and the second reference mark 422.

Figure 20:
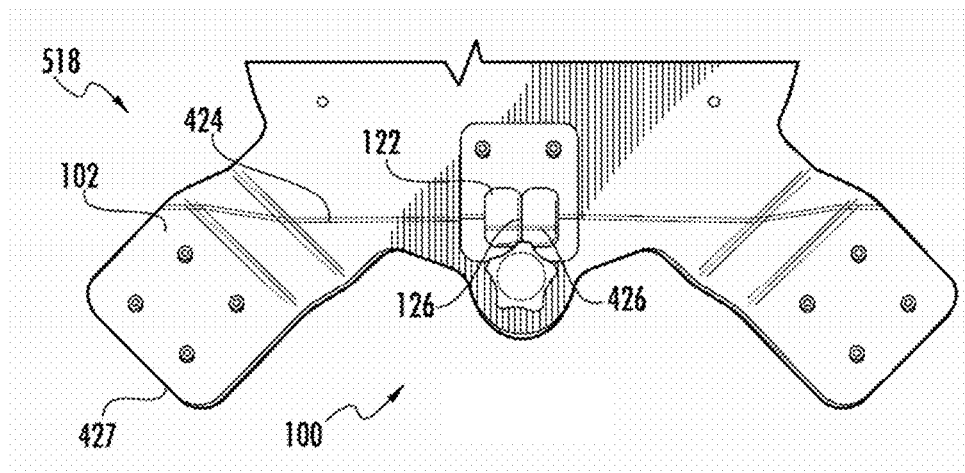

FIG. 20 depicts an image 518A, in which the line laser unit is mounted on the top laser unit mount 188 of the mounting bracket 174 of the transverse carriage assembly 108 (FIG. 6B). The laser line unit 112 is then operated to produce a laser line 424 that intersects the aperture 122 in the base plate assembly 102 of the calibration tool 100. The calibration tool 100 is then moved, via the plurality of wheels 118, so that the central reference mark 426 is visible through the pair of apertures 122, and such that the locating member 126 is centered on the central reference mark 426.

Figure 21:
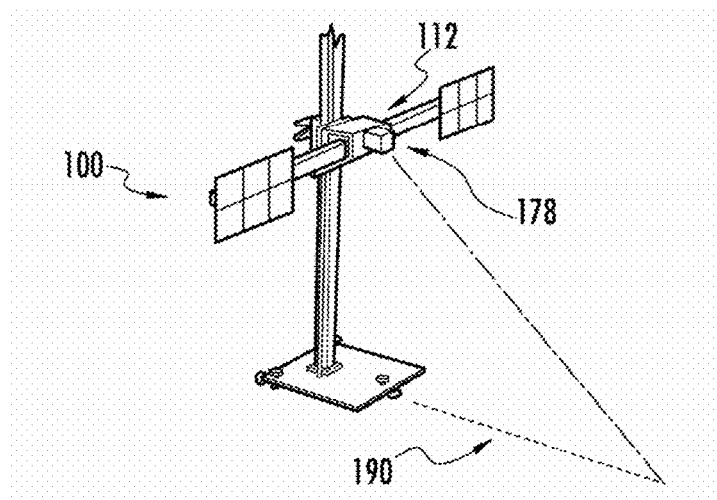

FIG. 21 depicts an alternative positioning for the laser line unit 112 on the calibration tool 100. The line laser unit 112 is mounted on the front facing side 178 of the mounting bracket 174, and is operated to produce a laser line 190 aligned with a center of the calibration tool 100. The laser line 190 can then be aligned with a central reference mark, such as the central reference 426 shown in FIG. 20.

Figure 22:
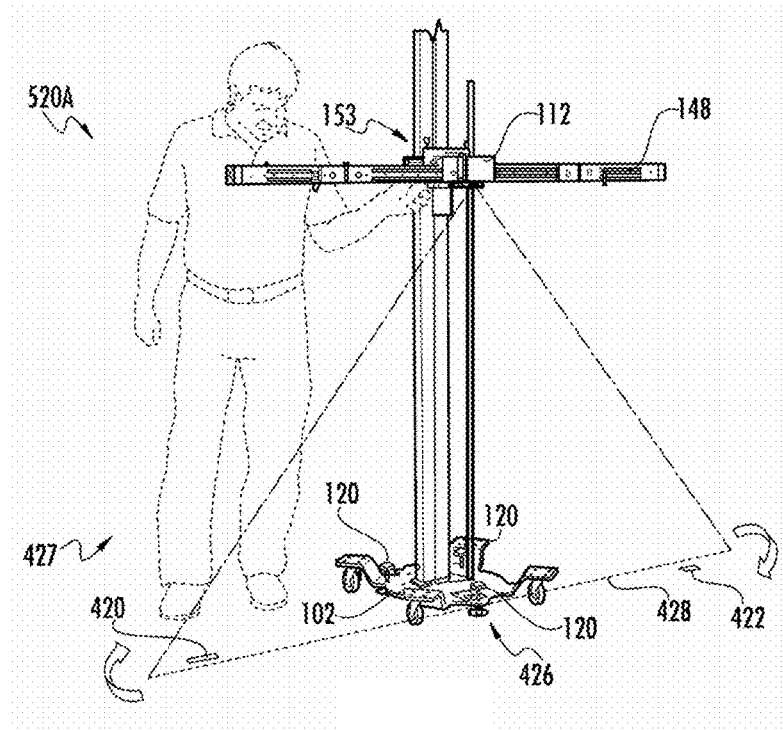

FIG. 22 depicts an image 520A, in which the plurality of feet 120 on the base 102 are operated to lift the wheels 118 of from the surface 427 and set a location of the calibration tool 100 that is centered on the central reference point. The laser line 424 indicates the yaw angle of the transverse mounting bar 148 relative to the reference marks 420, 422, and 426. The adjustment member 153 is then operated to adjust the yaw angle 159 (FIG. 6A) and pivot the transverse mounting bar 148 so that the transverse mounting bar 148 is aligned with the first reference mark 420, central reference mark 426, and the second reference mark 422.

Figure 23:
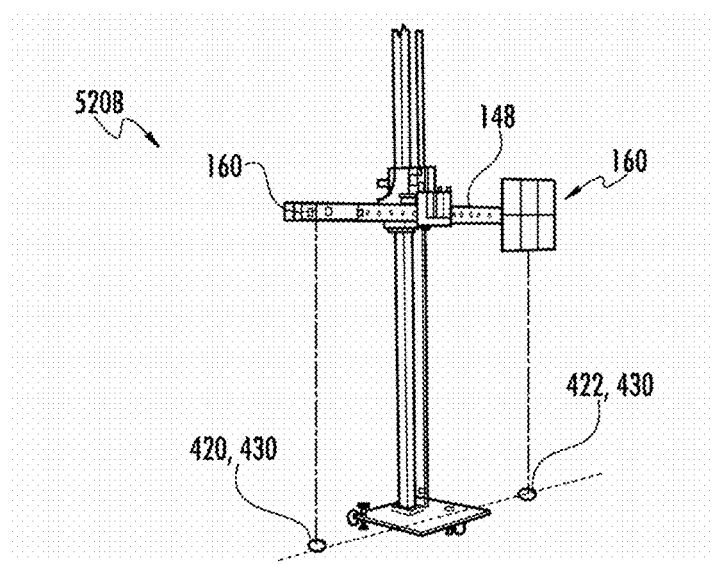

FIG. 23 depicts an image 520B showing an alternative procedure to the procedure depicting in image 520A for identifying the yaw angle 159 and aligning the transverse mounting bar 148. A pair of plum bobs 430 are mounted on a pair of opposing mounting members 160 on the transverse mounting bar 148. At least one of positions of the mounts 160, the location of the calibration tool 100, and the yaw angle 159 is adjusted to align the plum bobs 430 with the first reference mark 420 and the second reference mark 422, respectively.

Once positioned and oriented based on the specifications provided for a particular vehicle 400, the target mounts 160 are moved to locations predetermined by the specification by at least one of moving the vertically movable carriage assembly 106 to a predetermined position along the first rail axis 132, moving the horizontally movable carriage assembly 108 to a predetermined position along the second rail axis 142, and moving one or more of the target mounts 160 to predetermined positions along the third rail axis 164.

Figure 24:
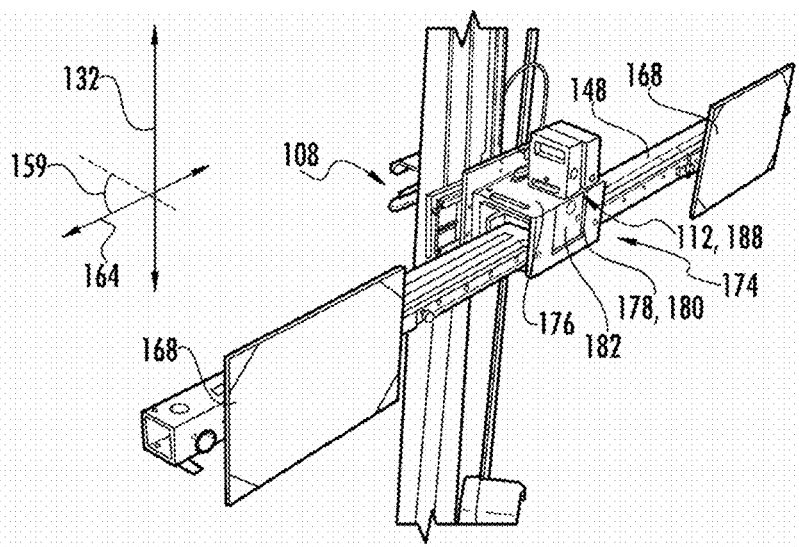

As discussed above, the calibration tool 100 (FIG. 1) is configured to receive various combinations of calibration target members at different positions based on the different specifications for different vehicles. FIG. 24 depicts an example where a pair of calibration targets 168 are disposed at opposite ends of the transverse mounting bar 148.

The plurality of target mounts 160 are mounted on the transverse rail 158 so as to be movable along the third rail axis 164. Thus, the yaw angle 159 of the transverse mounting bar 148 is also a yaw angle 159 for the plurality of target mounts 160. The second ruler 161 extends parallel to the third rail axis 164, and includes measurement markings to facilitate locating positions for the plurality of target mounts 160 along the transverse rail 158. Each of the plurality of target mounts 160 is configured to act as a respective mounting point to releasably mount a calibration target member.

Figure 25:
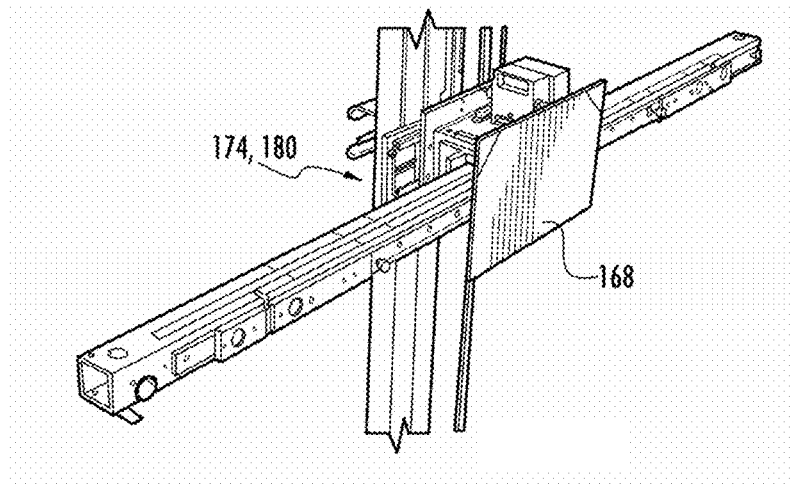

FIG. 25 depicts another example where a calibration target 168 is mounted on the front facing side 178 of the mounting bracket 174.

Figure 26:
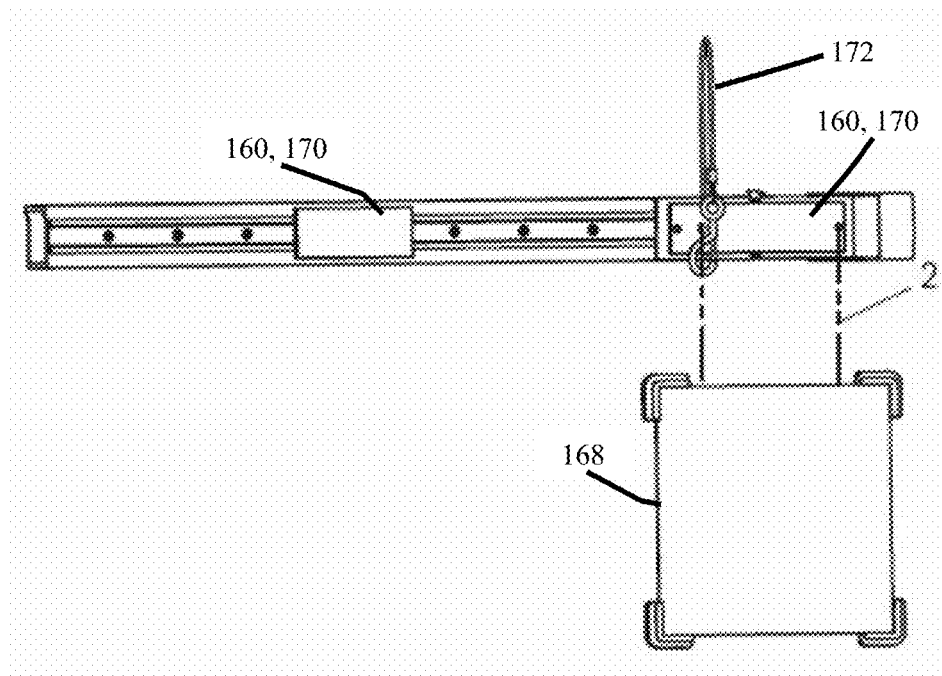

FIG. 26 depicts an exemplary calibration target member 168 mounted onto a target mount 160. In this embodiment, the target mount 160 includes a magnetic material that defines a magnetic mount 170, and also includes a safety cable 172. The calibration target member 168 includes a metallic material, and is configured to magnetically adhere to the magnetic mount 170. The magnetic adherence between the calibration target member 168 and the target mount 160 enables rapid installation and removal of different calibration target members from the calibration tool 100. The safety cable 172 is configured to engage with the calibration target member 168 and catch the calibration target member 168 in the event of a failure of the magnetic adherence between the calibration target member 168 and the magnetic mounting point 170 of the target mount 160.

In FIG. 26, the calibration target member 168 is depicted as having a substantially rectilinear shape. In other embodiments, calibration target members can have any arbitrary shape. In FIG. 26, the calibration target member 168 is also depicted as being mounted on a single target mount 160. In some embodiments, a single calibration target member are mounted on a plurality of mounting elements, and in some embodiments, a plurality of calibration target elements are mounted on a single mounting element. In various embodiments target mounts 160 of various sizes and shapes are also contemplated.

Figure 27:
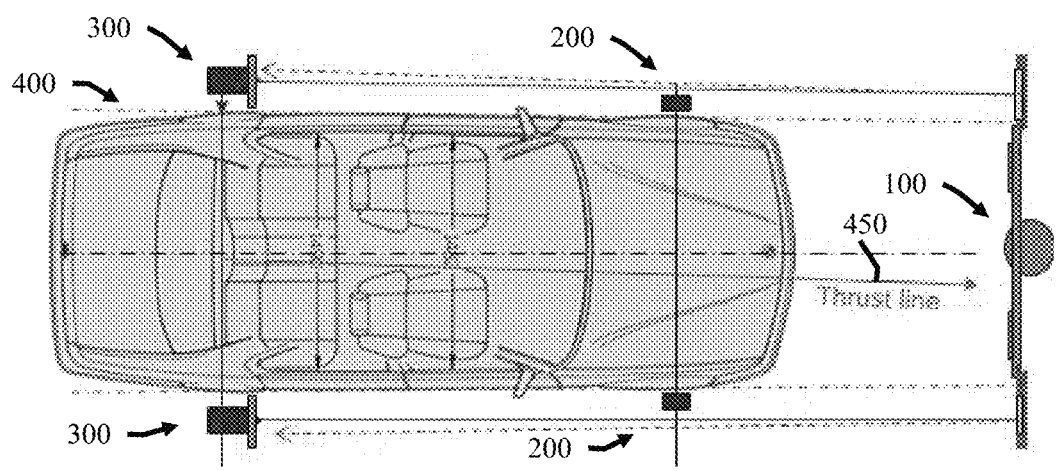
FIG. 27 depicts a schematic of the locations of the calibration tool, first measurement post, and second measurement post relative to a vehicle achieved using the methodology of FIGS. 15-25.

FIG. 27 depicts a top view of the positions of the calibration tool 100, first measuring posts 200 and second measuring posts 300 after being aligned according to the methodology discussed above. As illustrated in FIG. 27, the calibration tool 100 is located and oriented relative to not only the vehicle 400, but also to a thrust line 450 of the vehicle.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

What is claimed is:

1. A sensor calibration system, comprising:
a calibration tool that includes:
   a horizontal rail that defines a rail axis;
   a horizontally movable carriage assembly supported by the horizontal rail and movable along the rail axis;
   a transverse mounting bar that defines a mounting bar axis, and that is pivotably mounted on the horizontally movable carriage assembly so as to be pivotable about a pivot axis transverse to the rail axis and the mounting bar axis; and
   at least one target mount configured to releasably support at least one calibration target, and positioned on the transverse mounting bar such that:
      a movement of the horizontally movable carriage assembly along the rail axis adjusts a lateral position of the at least one target mount;
      a pivot of the transverse mounting bar about the pivot axis adjusts a yaw angle of the at least one target mount; and
      the movement of the horizontally movable carriage assembly along the rail axis and the pivot of the transverse mounting bar about the pivot axis are independent of each other.

2. The sensor calibration system of claim 1, wherein:
the transverse mounting bar includes a mounting rail; and
the at least one target mount is supported by the mounting rail and movable along the mounting bar axis such that a movement of the at least one target mount along the mounting bar axis adjusts a position of the at least one target mount along the mounting bar axis independently from the movement of the horizontally movable carriage assembly along the rail axis and the pivot of the transverse mounting bar about the pivot axis.

3. The sensor calibration system of claim 1, further comprising:
a vertical rail that defines a vertical axis; and
a vertically movable carriage assembly supported by the vertical rail and movable along the vertical axis;
wherein the horizontal rail is supported on the vertically movable carriage assembly such that:
   movement of the vertically movable carriage assembly along the vertical axis adjusts a vertical position of the at least one target mount; and
   the movement of the vertically movable carriage assembly is independent from the movement of the horizontally movable carriage assembly along the rail axis and the pivot of the transverse mounting bar about the pivot axis.

4. The sensor calibration system of claim 3, wherein the calibration tool further includes a base plate assembly supporting the vertical rail, and including an alignment member configured to align the calibration tool with a predetermined location on a surface on which the calibration tool is positioned.

5. The sensor calibration system of claim 1, wherein the at least one target mount includes at least one magnetic mounting point configured to magnetically engage with the at least one calibration target.

6. The sensor calibration system of claim 1, wherein the horizontally movable carriage assembly includes:
a spring member, the spring member positioned between the horizontally movable carriage assembly and the transverse mounting bar on a first side of the pivot axis, and the spring member configured to exert a force acting on the transverse mounting bar in a first direction about the pivot axis; and
an adjustment member positioned between the horizontally movable carriage assembly and the transverse mounting bar on a second side of the pivot axis opposite the first side and operable to counter-act the force of the spring member to set the yaw angle.

* * * * *